(12) United States Patent
Melchiors et al.

(10) Patent No.: US 6,455,645 B1
(45) Date of Patent: Sep. 24, 2002

(54) PROCESS FOR THE PRODUCTION OF TELECHELIC POLYMERS, TELECHELIC POLYMERS PRODUCED IN THIS MANNER AND USE THEREOF

(75) Inventors: Martin Melchiors, Leverkusen; Dieter Margotte, Krefeld; Hartwig Höcker, Aachen; Helmut Keul, Aachen; Andreas Neumann, Aachen, all of (DE)

(73) Assignee: Bayer Aktiengesellschaft, Leverkusen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/272,044

(22) Filed: Mar. 18, 1999

(30) Foreign Application Priority Data

Mar. 26, 1998 (DE) .......................... 198 13 353

(51) Int. Cl.⁷ .................................. C08F 4/42
(52) U.S. Cl. .................. 526/92; 526/135; 526/146; 526/147; 526/220; 526/319; 526/328.2
(58) Field of Search .................. 526/92, 319, 135, 526/145, 146, 147, 220; 525/326.2, 328.2

(56) References Cited

U.S. PATENT DOCUMENTS

| | | | |
|---|---|---|---|
| 4,581,429 A | 4/1986 | Solomon et al. ............ 526/220 |
| 5,322,912 A | 6/1994 | Georges et al. ............. 525/204 |
| 5,401,804 A | 3/1995 | Georges et al. ............. 525/267 |
| 5,412,047 A | 5/1995 | Georges et al. ............. 526/204 |
| 5,571,872 A | 11/1996 | Esselborn et al. .......... 525/384 |
| 5,583,184 A | 12/1996 | Esselborn et al. ........ 525/330.6 |
| 5,629,394 A | * 5/1997 | Cheradame et al. ........ 526/219 |
| 5,633,325 A | 5/1997 | Esselborn et al. ........ 525/326.2 |
| 5,708,102 A | 1/1998 | Fryd et al. .................. 526/172 |

FOREIGN PATENT DOCUMENTS

| | | |
|---|---|---|
| EP | 0 622 378 | 9/1997 |
| WO | 95/26987 | 10/1995 |
| WO | 96/30421 | 10/1996 |
| WO | 97/18247 | 5/1997 |

OTHER PUBLICATIONS

Adv. Polym. Sci. 81, 168 (month unavailable) 1987.

Makromol. Chem. Rapid Commun. 3 (month unavailable) 1982, pp. 127–132.

J. Am. Chem. Soc. 116, (month unavailable) 1994, pp. 11185–11186.

* cited by examiner

Primary Examiner—David W. Wu
Assistant Examiner—Tanya Zalukaeva
(74) Attorney, Agent, or Firm—Joseph C. Gil; Thomas W. Roy

(57) ABSTRACT

A novel process for the production of oligomeric and polymeric telechelic compositions, to the telechelic compositions produced in this manner and to use thereof in the plastics, fibres or lacquer sectors.

14 Claims, No Drawings

PROCESS FOR THE PRODUCTION OF TELECHELIC POLYMERS, TELECHELIC POLYMERS PRODUCED IN THIS MANNER AND USE THEREOF

FIELD OF THE INVENTION

The invention relates to a novel process for the production of oligomeric and polymeric telechelic substances, to the telechelic substances produced in this manner and to the use thereof in the plastics, fibers or lacquer sectors.

BACKGROUND OF THE INVENTION

Telechelic substances are generally defined as linear oligomers or low molecular weight linear polymers having functional groups on both chain ends. A comprehensive review of the production of telechelic substances may be found, for example, in Adv. Polym. Sci. 81, 168 (1987). They are significant, inter alia, as additives and as structural units (prepolymers) for copolymers having a defined structure (e.g., block copolymers, comb polymers, star polymers). When used as structural units in copolymers, telechelic substances must be as precisely bifunctional as possible.

The best known reactions for the production of telechelic substances which have a functionality of exactly two are (1) polyaddition reactions (for example, to yield polyurethanes or polyureas), (2) polycondensation reactions (for example, to yield polyesters, polycarbonates, or polyamides) as well as (3) ring-opening anionic or cationic polymerization reactions of heterocyclic monomers (for example, cyclic esters, carbonates, acetals or ethers), optionally with terminating reagents containing the desired functional groups.

Telechelic polyacrylates, i.e. low molecular weight acrylate polymers having two defined functional end groups which can participate in crosslinking, chain extension and/or coupling reactions conventionally used in lacquer chemistry are of great interest for use in the lacquer industry Telechelic polyacrylates, however, cannot be produced using any of the above-stated processes.

Various methods are known in polymer chemistry for incorporating functional end groups into polyvinyl or polyacrylate compounds, for example, oxidative chain scission (e.g., with oxygen, ozone, osmium or ruthenium tetroxide). However, these methods are non-specific and/or require the presence of double bonds in the polymer chains as a point of attack for scission. It is virtually impossible to achieve exact bifunctionality with these methods.

If monomers having the desired functional group are used in a free-radical polymerization in a quantity calculated to yield a functionality of two, a product mixture is obtained having an average functionality of two. The product, however, contains not only bifunctional molecules, but also tri- and more highly functional molecules, monofunctional molecules as well as non-functional polymer molecules.

If initiators and/or terminating reagents having the desired functional groups (such as functionalized diazo compounds, functionalized peroxides or redox initiators) are used instead of the monomers having functional groups, a functionality of two is generally not achieved because various termination reactions co-occur, e.g. disproportionation, recombination, termination by initiator radicals or termination by the terminating reagent.

In "dead and" polymerization, a large excess of an initiator having the desired end group is used. In this technique, each polymer chain can be terminated with an initiator molecule and is accordingly bifunctional. However, only very low molecular weight polymers are formed and large quantities of initiator are required.

Telomerization (i.e., polymerization of vinyl or arcrylate monomers in the presence of chain-transfer reagents having elevated chain-transfer constants) also yields only low molecular weights and this method is restricted to a few instances (e.g., Polymerization in the presence of tetrachloromethane, dibromomethane or disulfides having functional groups). since it is not entirely possible to suppress disproportionation as a termination reaction between two active chain ends, telechelic substances are obtained having functionalities of less than two. At least in the case of the halogen compounds, it is also necessary to perform a subsequent polymer-analogous reaction of the halogen substituents to yield the desired functional groups.

Telechelic polymethacrylates may be produced by group transfer polymerization with ketene silyl acetals, wherein the functional groups are formed by transformation of the silyl groups. Disadvantages of this method are (1) the requirement of high purity monomers and solvents and (2) the price and availability of the initiators which are needed, requirements which make such a process useful only for special applications.

EP-A 613,910 and EP-A 622,378 disclose the production of $\alpha$-$\omega$-polymethacrylate diols by selective transesterification of the terminal ester group of an $\alpha$-hydroxy-functional polyalkyl methacrylate. This process has various disadvantages. First, the $\alpha$-hydroxy-functional polyalkyl methacrylate is produced by free-radical polymerization in the presence of large quantities of mercaptoethanol, a compound which has a considerable odor nuisance. Second, the method is a multi-stage, energy-intensive and time-consuming process; the process involves the removal of the excess mercaptoethanol and the solvent used by distillation, transesterification with an excess of a diol in the presence of a catalyst, removal of the methanol by distillation, repeated washing of the product to remove the catalyst and excess diol as well as still further purification stages. Third, this reaction is restricted solely to the use of alkyl methacrylates, since the transesterification reaction otherwise no longer proceeds sufficiently selectively on the terminal ester group of the chain.

Another special technique which has a limited range of applications and no economic potential is ring-opening polymerization of unsaturated heterocyclics (for example, cyclic ketene acetals, unsaturated spiroorthocarbonates); such monomers are not industrialy avilable.

None of the methods so far mentioned is thus suitable for the production of the desired telechelic polyacrylates, because the desired functionality is not achieved, the method is restricted to only a few specific cases and/or polymer-analogous subsequent reactions are required. There is a need for a polymerization process which combines ease of performance with good control of the polymerization and in particular of the end groups of the polymer chains. Living free-radical polymerization is one such process.

Living free-radical polymerization is a relatively recent method for the performance of controlled free-radical polymerization. It combines the advantages of conventional free-radical polymerization (simple production process, low costs and a wide range of monomers) with those of living polymerization (polymers of a defined structure, molecular weight, molecular weight distribution and end group functionality). In this process, the objective of precise control of the free-radical polymerization is achieved by reversible chain termination/blocking ("end-capping") after each growth stage. The equilibrium concentration of the actively polymerizing chain ends at this point is so low in comparison with the equilibrium concentration of the blocked ("dormant") chain ends that termination and transfer reactions are largely suppressed in comparison with the growth reaction. since the end-capping is reversible, all the chain ends remain "living" providing that no terminating reagent is present. This allows control of the molecular weight, a narrow molecular weight distribution and purposeful functionalization of the chain end by terminatig reagents.

Initial attempts at controlled free-radical polymerization (using the iniferter method) were described, for example, in *Makromol. Chem., Rapid Commun.* 3 (1982), 127 and 132. The iniferter method here describes a class of free-radical initiators which can enter into initiation, transfer and reversible termination reactions, e.g., tetraalkylthiuram disulfides which are photolytically cleaved and activated. In this manner, it is possible to produce polymers having dithiocarbamate end groups and which may be reactivated by irradiation.

U.S. Pat. 4,581,429 discloses the principle of reversible chain termination by using free-radicals based in linear or cyclic nitroxides such as tetramethyl-1-piperidinyloxy (TEMPO). If this nitroxide is reacted with a reactive carbon radical capable of initiating a free-radical vinyl polymerization reaction, a reversibly cleavable C—O bond is formed which, when subjected to moderate heating, is capable of bringing about polymerization by insertion of vinyl monomers between the nitroxide and carbon radical. After each monomer addition, the newly formed radical is "scavenged" by the nitroxide; this reversibly blocked chain end may then insert further monomer molecules. Functional end groups are also described and in this case are obtained by polymer-analogous.

This concept of reversible termination with nitroxide has been developed into a practical polymerization method in, for example, *J. Am. Chem. Soc.* 116, 11185 (1994), *Macromolecules* 28, 2993 (1995), U.S. Pat. Nos. 5,322,912, 5,401, 804, 5,412,047 and 5,449,724; and WO 94/11412, WO 95/26987 and WO 95/31484. The starter system used in this case is a combination of dibenzoyl peroxide (BPO) and TEMPO.

Another approach is Atom Transfer Radial Polymerization (ATRP), in which a transition metal complex compoundd $ML_x$ abstracts a transferable atom or group of atoms X (for example, Cl and Br) from an organic compound RX to form an oxidized complex compound $ML_xX$ and an organic radical R•, which undergoes an addition reaction with a vinyl monomer Y to form the carbon radical RY•. This radical is capable of reacting with the oxidized complex compound, transferring X to RYX and $ML_x$, which can initiatae a new ATRP reaction and thus a further growth stage. The actively polymerizing species RY• is thus reversibly blocked by the abstractable group x with the assistance of the transition metal compound, which makes the redox process possible (for example, *Macromolecules* 28, 1721 (1995); *Macromolecules* 29, 1070 (1996), *Macromolecules* 28, 7970 (1995), WO 95/25765, WO 96/30421 and WO 97/18247).

It is an object of the invention to provide a process that produces a homo- or copolymer having a purposefully established molecular weight and narrow molecular weight distribution in a single reaction stage from one or more vinyl monomers, in particular, acrylate monomers and styrene.

It is an object of the invention to provide a process in which the resultant polymers have two functional end groups which are capable of further reaction or crosslinking with the functional groups usual in lacquer chemistry.

The foregoing objects have been achieved by a process in which telechelic substances may purposefully be produced by free-radical (co)polymerization of olefinically unsaturated monomers using the living free-radical polymerization method with an initiator system, which optionally contains one of the desired functional groups, in the presence of a functionalizing reagent, which has the desired functional group and terminates the chains once the monomers have been consumed.

SUMMARY OF THE INVENTION

The present invention relates to a process for the production of oligomeric and polymeric telechelic substances of the formula

wherein

Q represents an oligomeric, optionally substitued hydrocarbon residue with a molecular weight $300<Q<10000$ of the formula

in which n is an interger in the range $3 \leq n \leq 500$ and R', R", R'" may mutually independently be H, $C_1$–$C_{20}$-(cyclo)alkyl, $C_6$–$C_{24}$-aryl, Halogen, CN, $C_1$–$C_{20}$-alkyl ester oder alkylamide, $C_6$–$C_{24}$ arylester or arylamide, wherein R', R", R'" may also contain further functional groups such as, for exemple, aldehyde, keto or ether groups and R' and R" may also be constituents of a ring, for example, in a cyclic anhydride, cyclic imide or cyclic alkane and the functional gropus $Y^1$, $Y^2$ may be identical or different. the process involves the polymerization of:

A) free-radically polymerizable, ethylenically unsaturated monomers of the formula

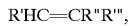

in which R', R", R'" have the above-stated meaning and contain none of the functional groups $Y^1$, $Y^2$, or a mixture of such monomers with B) an initiator compound or a mixture of such compounds, C) a transition metal compound or a mixture of compound and D) one or more complex ligands which are capable of complexing the central atom(s) of the compound C, characterized in that polymerization is performed E) a functionalizing reagent which has at least one C=C double bond and least one of the desired functional groups $Y^1$, $Y^2$.

The present invention also provides the telechelic substances obtainable using the process according to the invention.

The present invention also provides the use of the telechelic substances according to the invention as structural units for plastics, adhesives or fibers and as a binder, binder component or structural unit for binder components in coating compositions and adhesives.

DETAILED DESCRIPTION OF THE INVENTION

A preferred process is for the production of oligomeric or polymeric telechelic substances $Y^1$—Q—$Y^2$ of the molecular weight $500<M_n<10000$, in which Q denotes an oligomeric or polymeric, optionally substituted, hydrocarbon residue as defined above with a molecular weight $300<Q<10000$ and $Y^1$, $Y^2$ may be identical or different and represent functional groups reactive towards isocyanates, alcohols, carboxylic acids or epoxides, by polymerization of A) free-radically polymerizable, ethylenically unsaturated monomers of the formula $$R'HC=CR''R''',$$

in which R', R'', R''' have the above-stated meaning and contain none of the functional groups $Y^1$, $Y^2$, or a mixture of such monomers, which contain no groups $Y^1$, $Y^2$ in the molecule, or a mixture of such monomers with B) an initiator compound $R^1R^2R^3C$—X, which contains one or more free-radically abstractable or transferable atoms or groups of atoms X, in which $R^1$ represents either X or a linear or branched alkyl residue which is substituted either with X or with $Y^1$ and, optionally, further residues, and $R^2$, $R^3$ mutually independently represent hydrogen or optionally substituted, linear or branched aliphatic or aromatic hydrocarbon residues or electron-attracting substituents such as COOR, CN, $NO_2$, COCl, CONHR, $CONR_2$, or COR, C) a transition metal compound $M_pZ_q$, which is prepared from a cation of a metal M from the group comprising cu, Fe, ru, Cr. MO, Wo, Mn, Rh, Re, Co, Ni, V, ZN, Au, Ag or Sm, wherein M may be present in the transition metal compound in different oxidation states and may participate in a reversible redox process, and an anion Z from the group comprising halide, hydroxide, $C_1$–$C_6$ alkoxy, $SO_4^{2-}$, $PO_4^{2-}$, $R^4PO_4^{2-}$, $R^4R^5PO_4^-$, $R^3R^4R^5P$—, $CF_3COO$—, $PF_6^-$, $CH_3SO_3^-$, $ArSO_3^-$, $CN^-$ oder $R^4COO^-$, wherein $R^4$, $R^5$ mutually independently represent hydrogen or an optionally aryl- or halosubstituted alkyl residue, and wherein p and q are determined by the valencies of M and Z in the transition metal compound and D) a mono- or polydentate complex ligand L, which contains one or more nitrogen, oxygen, sulphur or phosphorus atoms and may combine with at least one cation of the metal M to form complexes, characterized in that components A) to D) are reacted in a living free-radical polymerization reaction to yield the telechelic substance $Y^1$—Q—$Y^2$ in the presence of E) a compound $R^6R^7C=CR^8(R^9$—$Y^2)$, which contains at least one olefinic double bond and at least one functional group $Y^2$ reactive towards isocyanates, alcohols, carboxylic acids or epoxides, wherein a carbon residue $R^9$ must be present between the double bond and $Y^2$, which carbon residue $R^9$ represents a linear or branched, optionally substituted alkyl chain having a minimum length of 1 methylene group, and wherein $R^6$, $R^7$ and $R^8$ mutually independently represent hydrogen or an optionally aryl- or halosubstituted alkyl residue.

Any known free-radically polymerizable olefins and substituted olefins may in principle be used in the free-radically polymerizable, ethylenically unsaturated monomers A. Substituents which may be considered are, for example, hydrogen (H), linear or branched alkyl residues (R) having 1 to 20 carbon atoms, which may optionally also have further substituents, α,β-unsaturated linear or branched alkenyl or alkynyl residues, which may optionally also have further substituents, cycloalkyl residues, which may also have heteroatoms, such as, O, N or S in the ring and optionally further substituents, optionally substituted aryl or heteroaryl residues, halogen, CN, $CF_3$, COOR, CONHR, $CONR_2$, COR (where $R=C_1$–$C_{20}$).

The free-radically polymerizable double bond of the ethylenically unsaturated monomers A may also be part of a ring such as in cyclic olefins or olefinically unsaturated anhydrides or imides.

Preferably used monomers for the production of Q comprise: (meth)arylic acid esters of $C_1$–$C_{20}$ alcohols, acrylonitrile, cyanoacrylic acid esters of $C_1$–$C_{20}$ alcohols, maleic acid diesters of $C_1$–$C_6$ alcohols, maleic anhydride, vinylpyridines, vinyl(alkylpyrroles), vinyloxazoles, vinyloxazolines, vinylthiazoles, vinylimidazoles, vinylpyrimidines, vinyl ketones, styrene or styrene derivates, which have in a α position a $C^1$–$c^6$ alkyl residue or halogen and have up to three further substituents on the aromatic ring.

Butyl acrylate, 2-ethylhexyl arcylate, methyl methacrylate, butyl methacrylate, cyclohexyl methacrylate, isobornyl methacrylate, maleic anhydride or styrene are preferably used.

The initiator compound B comprises substances of the formula $R^1R^2R^3X$ containing one or more free-radically abstractable or transferable atoms or groups of atoms X, in which $R^1$ represents either X or a linear or branched $C_1$–$c_{20}$ alkyl residue, which is substituted either with X or with $Y^1$ and optionally further residues and $R^2$, $R^3$ mutually independently represent hydrogen or optionally substituted, linear or branched $C_1$–$C_{20}$ aliphatic or $C_6$–$c_{24}$ aromatic hydrocarbon residues or electron-attracting substituents such as, for example, COOR, CN, $NO_2$, COCl, CONHR, $CONR_2$ or COR (where $R=C_1$–$C_{20}$). Compound B may either B1) contain a functional group $Y^1$ or B2) contain no $Y^1$, but instead contain in the substituents an additional group X (i.e., a total of two groups X per initiator molecule).

In the initiator compounds B1, the residue $R^1$ may be described by the formula $Y^1$—$R^{10}$, in which $R^{10}$ represents a linear or branched hydrocarbon residue with 1–10 carbon atoms and optionally substituted with aromatic residues, which hydrocarbon residue may optionally also contain ether, ester, amide, urethane or urea gropus and may additionally also contain linear polymeric blocks such as polyether blocks, polyester blocks or polyacrylate blocks, and $Y^1$ represents a functional group selected from —OH, —Cl, —COOH, —COOR, —CN, —$NO_2$, —$SO_3H$, —COCl, —CONHR, —$CONR_2$, —OR, —OP(=O)R, —OP(=O)(OR), —OP(=O)(OR)$_2$ or —C(=O)R and R, $R^1$, $R^2$ and $R^3$ have the above-stated meaning.

Compounds of the formulae

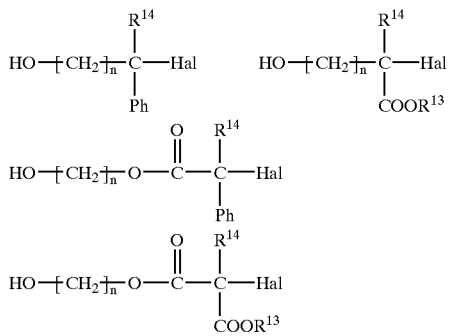

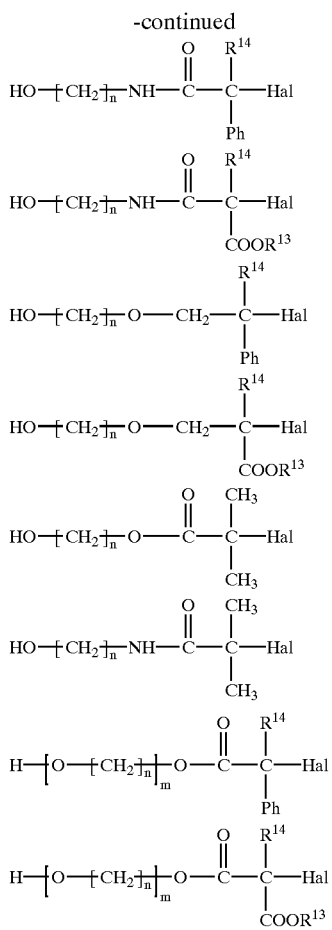

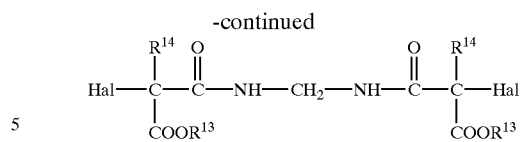

are preferably used as component B1, wherein Hal=Cl or Br, $R^{13}=C_1-C_6$ alkyl, $R^{14}=H$ or $CH_3$, n=1–10 and m=1–225.

In initiator compounds B2 residue $R^1$ may be identical to X or be described by the formula $X-CR^{10}R^{11}R^{12}$, in which $R^2$, $R^3$ and $R^{10}$ have the above-stated meaning and $R^{11}$ and $R^{12}$ mutually independently represent hydrogen or optionally substituted, linear or branched aliphatic or aromatic hydrocarbon residues. Compounds of the formulae

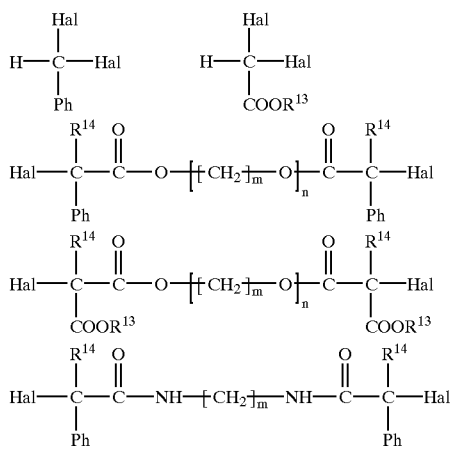

are preferably used as component B2, wherein Hal=Cl or Br, $R^{13}=C_1-C_6$ alkyl, $R^{14}=H$ or $CH_3$, n=1–225 and m=2–6.

The transition metal compound C comprises substances of the formula $M_pZ_q$, which are prepared from a cation of a metal M from the group comprising Cu, Fe, Ru, Cr, Mo, Wo, Mn, Rh, Re, Co, Ni, V, Zn, Au, Ag or Sm, wherein M may be present in the transition metal compound in different oxidation states and may participate in a reversible redox process, and an anion Z from the group comprising halide, hydroxide, $C_1-C_6$ alkoxy, $SO_4^{2-}$, $PO_4^{3-}$, $R^4PO_4^{2-}$, $R^4R^5PO_4^{-}$, $R^3R^4R^5P-$, $CF_3COO-$, $PF_6^-$, $CH_3SO_3^-$, $ArSO_3^-$, $CN^-$ oder $R^4COO^-$, wherein $R^4$, $R^5$ mutually independently represent hydrogen or an optionally $C_6-C_{24}$ aryl- or halo-substituted (Cl. Br) alkyl residue, and wherein p and q denote a number of 1, 2, 3, 4 or 5 and are not determined by the valencies of M and Z in the transition metal compound. CuCl, mixtures of CuCl and $CuCl_2$, CuBr or mixtures of CuBr and $CuBr_2$ are preferably used as component C.

The anion Z of the transition metal compound is conventionally the same as the abstractable group X of the initiator. Z and X may, however, also be different.

Component D comprises one or more complex ligands L, which may be mono- or polydentate, which contain one or more nitrogen, oxygen, phosphorus or sulfur atoms and may combine with at least one cation of the metal M to form complexes. Examples of such ligands are diamines, diamides, aminoalcohols, diols, hydroxycarboxylic acid esters, aminocarboxylic acid esters, bipyridines, bipyrroles, phenanthrolines, cryptands, crown ethers or porphyrins. Ligands which complex the central atom (for example by means of π bonds), aromatic compounds, (poly)olefins or (poly)alkynes, as well as cyclopentadienyl compounds may also be suitable. Compounds of the formula

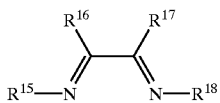

are, however, preferably used as component D, wherein $R^{15}$ to $R^{18}$ mutually independently represent hydrogen or $C_1-C_{20}$ aliphatic or $C_6-C_{24}$ aromatic hydrocarbon residues, and $R^{15}$ to $R^{18}$ may optionally also be linked together to form an unsaturated, optionally aromatic, ring containing nitrogen, and wherein component D may also be attached to a polymer or incorporated into a polymer chain by means of one or more of residues $R^{15}$ to $R^{18}$.

It is essential to the invention that polymerization is performed in the presence of a functionalizing reagent E. This reagent comprises a compound of the formula $R^6R^7C=CR^8(R^9-Y^2)$, which contains at least one olefinic double bond and at least one functional group $Y^2$ reactive towards isocyanates, alcohols, carboxylic acids or epoxides, wherein a carbon residue $R^9$ must be present between the double bond and $Y^2$, which carbon residue $R^9$ represents a linear or branched, optionally substituted $C_1-C_{20}$ alkyl chain having a minimum length of 1 methylene group, and wherein $R^6$, $R^7$ and $R^8$ mutually independently represent hydrogen or an optionally aryl- or halo-substituted alkyl residue. In some cases a mixture of such compounds may also, but not preferably, be used. Component E is preferably selected from compounds of the group.

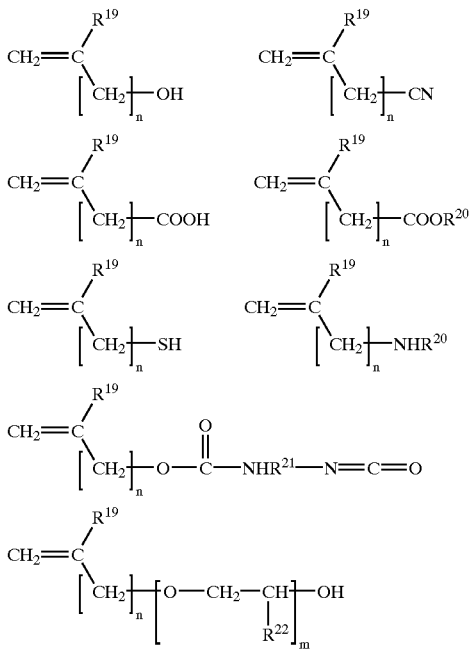

wherein $R^{19}$ represents hydrogen or a linear or branched $C_1$–$C_6$ alkyl chain and $R^{20}$ and $R^{21}$ represent any desired hydrocarbon residues having 1 to 20 C atoms, $R^{22}$ is hydrogen or a $C_1$–$C_{20}$ alkyl residue, preferably methyl, n may be 1–4 and m my be 1–10. It is particularly preferred to use 2-propen-1-ol, 3-buten-1-ol, 4-penten-1-ol, 5-hexen-1-ol or the propoxylated derivates thereof obtained by addition of 1–10 mol of propylene oxide onto the OH group.

In order to produce the desired telechelic substances using the process according to the invention, components A to E must be present in the system in certain molar ratios. The complex ligand D should be present relative to the transition metal compound C at a molar ratio of D:C of 1:1 to 4:1. preferably of 0.5:1 to 3.1. The initiator compound B must here be present relative to the transition metal compound C at a molar ratio of B:C of 0.3:1 to 5:1, preferably of 1:1 to 3:1. Component E is used in a quantity corresponding to a molar ratio of B:C of 0.3:1 to 5:1, preferably of 1:1 to 3:1. Component E is used in a quantity corresponding to a molar ratio of C=C double bonds in component E to transferable atoms/groups of atoms X in component B of at least 1:1, preferably of at least 3:1.

The quantity of component A (monomers) to initiator compound C is determined as a function of the desired molecular weight or degree of polymerization of the telechelic substance. Since the process according to the invention involves a living polymerization reaction, from which termination or transfer reactions are substantially absent, and component E does not undergo addition onto the active chain ends until after component A has been consumed, the person skilled in the art may readily calculate the required initiator concentration [B] for a given initial monomer concentration [$A_0$] if a degree of polymerization $P_n$ is to be achieved:

[B]=$x_p$·[$A_0$]/$P_n$ wherein $x_p$=([$A_0$]–[A])/[$A_0$] represents the degree of concersion and [A] the actual monomer concentration at conversion $x_p$. It is evident from the above that telechelic substances of any desired molecular weight may be produced using the process according to the invention. Preferably, however, molecular weights of 500<$M_n$<10000, preferably of 100<$M_n$<5000, are established. The molecular weight distributions obtained are very narrow and are within the range 1.1<$M_w$/$M_n$<1.5.

The telechelic substances produed using the process according to the invention have functionalities ($Y^1$+$Y^2$) of 1.6 to 2.0, generally, however, of >1.8 to 2.0, but never of >2.0. One of the two end groups may also be present in derivatized or protected form, wherein functionalities of 0.8 to 1.0, geneerally of >0.9 to 1.0, are then obtained.

The reaction in the process according to the invention may be perfomed at temperatures of between room temperature and 180° C., preferably of between 80° C. and 150° C., preferably of between 90° C. and 130° C. the reaction may be performed both without solvents (in the monomer or monomer mixture) and in an organic solvent known in lacquer technology. It may be performed in air or under a protective gas atmosphere; a protective gas atmosphere (for example nitrogen or argon) is preferably used.

The telechelic substances $Y^1$—Q—$Y^2$ according to the invention may be used as structural units in block copolymers, which are present, for example, in plastics, fibers, adhesives or binders or binder components in coating compositions. Depending upon the chemical nature of the plastics, fibers, adhesives or binders and the functionalities of the other structural units present therein, the functional groups $Y^1$, $Y^2$ of the telechelic substance may be selected such that the synthesis reactions to yield the block copolymer proceed in a straightforward and controlled manner. It is possible by means of the monomer composition of the central block Q of the telechelic substance to introduce properties into the block copolymers produced therefrom, such as rigidity, flexibility, hydrophobicity, hydrophilicity, deliberate incompatibilities or additional functionalities.

Depending upon the functionality $Y^1$, $Y^2$, the telechelic substances according to the invention may also be used in unmodified form as a binder, binder component, curing agent or curing agent component in coating compositions and adhesives.

The invention is further illustrated but is not intended to limited by the following examples in which all parts and percentages are by weight unless otherwise specified.

EXAMPLES

Example 1
Production of a Telechelic Substance According to the Invention 1 equivalent (49 parts by weight) of CuCl, 3 equivalents (234 parts by weight) of bipyridine, 18.8 equivalents (939 parts by weight) of methyl methacrylate, 20 equivalents (582 parts by weight) of allyl alcohol and 2 equivalents (246 parts by weight) of 4-hydroxybutyl-2-chloro-2-phenyl acetate was added to 710 parts by weight of butyl acetate under a nitrogen atmosphere in a multi-necked flask. The mixture was heated to 130° C. and stirred at this temperature for 60 hours. After this period, the mixture was diluted with a quantity of dichloromethane corresponding to the quantity of butyl acetate and this solution was washed with a 5% hydrochloric acid solution. After phase separation, the organic phase was evaporated under a vacuum and the product precipitated by slowly running this solution into hexane. After filtration and drying, a hydroxy-telechelic substance was obtained at a yield of 91% which, according to GPC, had a number average molecular weight of 1900 and a polydispersity of 1.25. The degree of functionalization, determined by $^1$H-NMR spectroscopy and OH titration, was 1.8. In the MALDI-TOF spectrum, bishydroxy-functional oligomers were detected as the principal product, together with small quantities of monohydroxy-functional oligomers; non-functional oligomers were not found.

Examples 2–6

The mixtures of the components started in table 1 (all quantities stated as parts by weight) were combined and reacted and made in (=isolation and purification of the crude product) accordance with the procedure of Example 1:

TABLE 1

Production of telechelic substances according to the invention

| Example no. | 1 | 2 | 3 | 4 | 5 | 6 |
|---|---|---|---|---|---|---|
| CuCl | 49 | 25 | 25 | 20 | 9 | 30 |
| CuBr | | | | | | |
| Bipyridin | 234 | 117 | 117 | 94 | 43 | 140 |
| Methyl methacrylate | 939 | 500 | 196 | 400 | 187 | 100 |
| n-Butyl acrylate | | | | 894 | | 128 |
| 2-Ethylhexyl acrylate | | | | | | 184 |
| Allyl alcohol | 582 | | | 135 | 171 | |
| Allyl-N-(4-methyl-phenyl)carbamate | | 175 | 112 | 153 | | 344 |
| 4-Hydroxybutyl-2-chloro-2-phenylacetate | 246 | 61 | | | | |
| N-(2-Hydroxyethyl)-2-chloro-2-phenylacetamide | | | 50 | | | |
| 2-Bromoisobutyric acid ethyl ester | | | | | | |
| α,α-Dichlorotoluene | | | | 32 | 15 | 48 |
| Butyl acetate | 710 | 440 | 440 | 440 | 180 | 440 |
| Reaction time [h] | 60 | 20 | 21 | 24 | 22 | 21 |
| Reaction temp. [° C.] | 130 | 130 | 130 | 130 | 130 | 130 |
| M$_n$ (GPC) | 1900 | 6300 | 2500 | 3000 | 3100 | 2000 |
| M$_w$/M$_n$ (GPC) | 1,25 | 1,14 | 1,39 | 1,43 | 1,25 | 1,43 |
| Functionality* | 1,8 | 1,9 | 1,97 | 1,95 | >1.6 | >1,8 |

*Explanations concerning end group functionality,

Examples 1–6:

Example 1: OH-functional initiator+end capping with allyl alcohol

Examplex 2 and 3: OH-functional initiator+end capping ith the penylurethane derivate of allyl alcohol Example 4 and 6: double end capping with the phenylurethane derivative of allyl alcohol.

Example 5: double end capping with allyl alcohol.

Although the invention has been described in detail in the foregoing for the purpose of illustration, it is to be understood that such detail is solely for that purpose and that variations can be made therein by those skilled in tha art without departing from the spirit and scope of the invention except as it may be limited by the claims.

What is claimed is:

1. A process for making a telechelic composition the formula:

$$Y^1-Q-Y^2,$$

wherein Q represents an oligomeric, optionally substituted, hydrocarbon residue with a molecular weight 300<Q<1000 of the formula

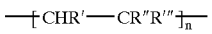

wherein n is an integer in the range 3≦n≦500, each R', R", R'" comprise a component selected from the group consisting of H, a $C_1$–$C_{20}$ (cyclo)alkyl, a $C_6$–$C_{24}$ aryl, halogen, CN, a $C_1$–$C_{20}$ alkyl ester, an alkylamide, a $C_6$–$C_{24}$ aryl ester and arylamide, aldehydes, keto groups, ether groups, or wherein each R', R", R'" is a constituent of a ring comprising a component selected from the group consisting of cyclic anhydrides, cyclic imides, cyclic alkanes and wherein $Y^1$ and $Y^2$ are functional groups that are identical or different;

wherein the process comprises polymerization of:

A) a monomer component comprising free-radically polymerizable, ethylenically unsaturated monomers of the formula

R'HC=CR"R'", in which R', R", R'" have the above stated meaning and which contain no groups $Y^1$, $Y^2$ in the molecule, or a mixture of such monomers with B) an initiator component, C) a transition metal component, and D) one or more complex ligands which are capable of complexing the central atom(s) of the compound C, characterized in that polymerization is performed in the presence of E) a functionalizing reagent which has at least one C=C double bond, at least one of the desired functional groups $Y^1$, $Y^2$, and which terminates the chain.

2. The process of claim 1, wherein the compound $Y^1$—Q—$Y^2$ has molecular weight 500<M$_n$<10000, where $Y^1$ and $Y^2$ each comprise a component selected from the group functional groups consisting of isocyanate-reactive compounds, alcohol-reactive compounds, carboxylic acid-reactive compounds and epoxide-reactive compounds, and wherein the process comprises the polymerization of:

A) a monomer component comprising free-radically polymerizable, ethylenically unsaturated monomers of the formula

R'HC=CR"R'", in which R', R", R'" have the above-stated meaning and contain none of the functional groups $Y^1$, $Y^2$, or a mixture of such monomers, B) an initiator component comprising a compound $R^1R^2R^3C$—X, which contains one or more free-radically abstractable or transferable atoms or groups of atoms X, in which R1 represents either X or a linear or branched alkyl residue which is substituted either with X or with Y1 and optionally further residues, and R2, R3 independently represent hydrogen or optionally substituted, linear or branched aliphatic or aromatic hydrocarbon residues or electron-attracting substituents such as COOR, CN, NO$_2$, COCl, CONHR, CONR$_2$ or COR, C) a transition metal component comprising a compound $M_pZ_q$, which comprises Cu, Fe, Ru, Cr, Mo, Wo, Mn, Rh, Re, Co, Ni, V, Zn, Au, Ag or Sm, wherein M may be present in the transition metal compound in different oxidation states and may participate in a reversible redox process, and an anion Z from the group comprising halide, hydroxide, $C_1$–$C_6$ alkoxy, $SO_4^{2-}$, $PO_4^{3-}$, $R^4PO_4^{2-}$, $R^4R^5PO_4^-$, $R^3R^4R^5P-$, $CF_3COO-$, $PF_6^-$, $CH_3SO_3^-$, $ArSO_3^-$, $CN^-$ or $R^4COO-$, wherein $R^4$, $R^5$ independently represent hydrogen or an optionally aryl- or halo-substituted alkyl residue, and wherein p and q are determined by the valencies of M and Z in the transition metal compound and D) a mono- or polydentate complex ligand L, which contains one or more nitrogen, oxygen, sulphur or phosphorus atoms and may combine with at least one cation of the metal M to form complexes, characterized in that components A) to D) are reacted in a living free-radical polymerization reaction to yield the telechelic substance $Y^1-Q-Y^2$ in the presence of E) a compound $R^6R^7C=CR^8(R^9-Y^2)$, which contains at least one olefinic double bond and at least one functional group $Y^2$ reactive towards isocyanates, alcohols, carboxylic acids or epoxides, wherein a carbon residue $R^9$ must be present between the double bond and $Y^2$, which carbon residue $R^9$ represents a linear or branched, optionally substituted alkyl chain having a minimum length of 1 methylene group, and wherein $R^6$, $R^7$ and $R^8$ independently represent hydrogen or an optionally aryl- or halo-substituted alkyl residue.

3. The process of claim 1, wherein component B comprises a compound having the formula $R^1R^2R^3C-X$, wherein $R^1$ has the formula $Y^1-R^{10}$, wherein $R^{10}$ represents a linear or branched hydrocarbon residue with 1–10 carbon atoms and optionally substituted with aromatic residues, which hydrocarbon residue may optionally also contain ether, ester, amide, urethane or urea groups, and may additionally also contain linear polymeric blocks, and wherein $Y^1$ comprises a component selected from the group consisting of $-OH$, $-Cl$, $-COOH$, $-COOR$, $-CN$, $-NO_2$, $-SO_3H$, $-COCl$, $-CONHR$, $-CONR_2$, $-OR$, $-P(=O)R$, $-OP(=O)(OR)$, $-OP(=O)(OR)_2$ or $-C(=O)R$, wherein $R^2$, $R^3$ have the above-stated meaning.

4. The process of claim 1, wherein component B comprises a component selected from the group consisting of compounds having the formulae

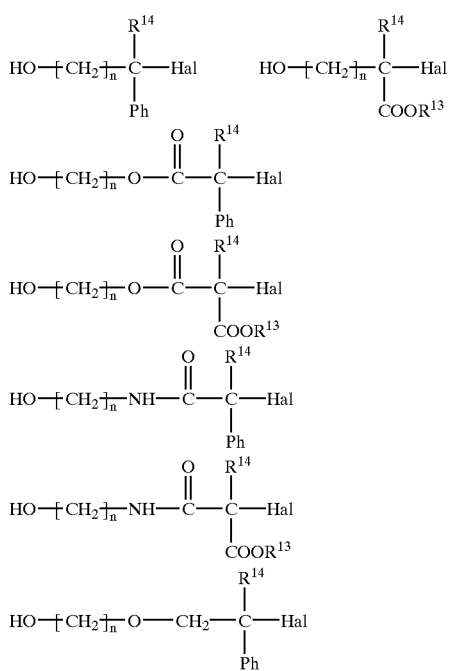
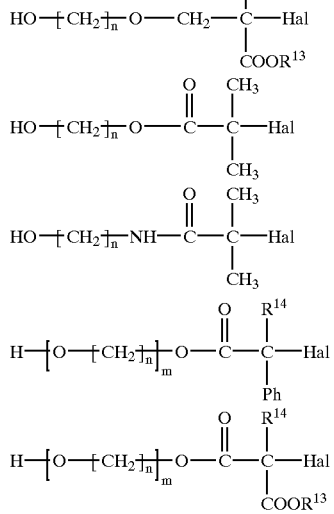

wherein Hal=Cl or Br, $R^{13}=C_1-C_6$ alkyl, $R^{14}=H$ or $CH_3$, n=1–10 and m=1–225.

5. The process of claim 1, wherein component B comprises a compound having the formula $R^1R^2R^3C-X$, which contains no functional groups $Y^1$, wherein $R^1$ is identical to X or has the formula $X-CR^{10}R^{11}R^{12}$, wherein $R^2$, $R^3$ and $R^{10}$ have the above-stated meaning and $R^{11}$ und $R^{12}$ independently represent hydrogen or optionally substituted, linear or branched aliphatic or aromatic hydrocarbon residues.

6. The process of claim 1, wherein the component B comprises a component selected from the group consisting of compounds having the formulae

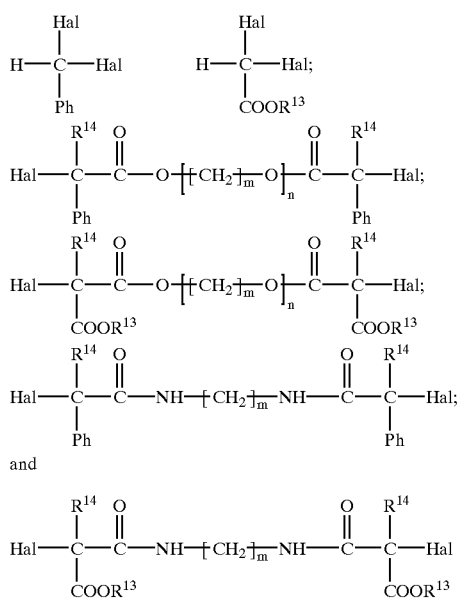

wherein Hal=Cl or Br, $R^{13}=C_1-C_6$ alkyl, $R^{14}=H$ or $CH_3$, n=1–225 and m=2–6.

7. The process of claim 1, wherein the component A comprises a component comprising a compound selected from the group consisting of butyl acrylate, 2-ethylhexal acrylate, methyl methacrylate, butyl methacrylate, cylohexyl methycrylate, isobornyl methacrylate, butyl methacrylate, cyclohexyl methacrylate, isobornyl methacrylate, maleic anhydride or styrene, and mixtures thereof.

8. The process of claim 1, wherein component C comprises a component comprising a compound selected from the group consisting of CuCl, mixtures of CuCl and $CuCl_2$, CuBr, and mixtures of CuBr and $CuBr_2$.

9. The process of claim 1, wherein component D) comprises a compound selected from the group consisting of compounds having the formula

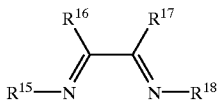

wherein $R^{15}$ bis $R^{18}$ independently represent hydrogen or $C_1$–$C_{20}$ aliphatic or $C_6$–$C_{24}$ aromatic hydrocarbon residues, and $R^{15}$ bis $R^{18}$ may optionally also be linked together to form an unsaturated, optionally aromatic, ring containing nitrogen, and wherein component D may also be attached to a polymer or incorporated into a polymer chain by means of one or more of residues $R^{15}$ to $R^{18}$.

10. The process of claim 1, wherein component E comprises a component selected from the group consisting of

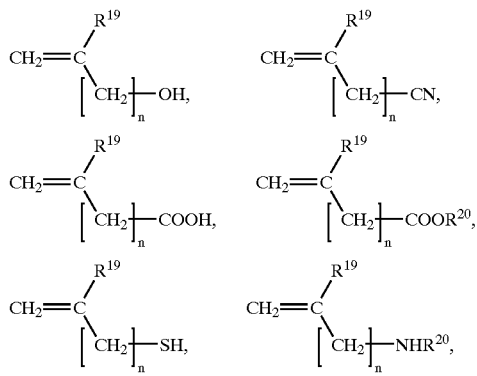

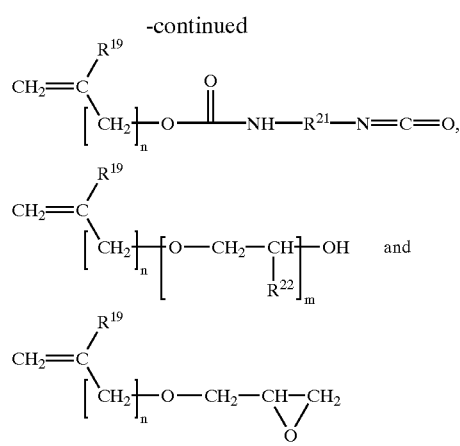

wherein $R^{19}$ is hydrogen or a linear or branched $C_1$–$C_6$ alkyl chain, $R^{20}$ and $R^{21}$ is a hydrocarbon residue, $R^{22}$ is hydrogen or an alkyl residue, preferably methyl, n may be 1–4 and m may be 1–10.

11. The process of claim 1, wherein component E comprises a compound selected from the group consisting of 2-propen-1-ol, 3-buten-1-ol, 4-penten-1-ol, 5-hexen-1-ol, and the corresponding propoxylated compounds obtained by addition of 1–10 mol of propylene oxide onto the OH group.

12. The process of claim 1, wherein the complex ligand D is used relative to the transition metal compound C at a molar ratio of D:C of 2.5:1 to 3:1 and the initiator compound B is present relative to the transition metal compound C at a molar ratio of B:C of 1:1 to 3:1 and component E is used in a quantity corresponding to a molar ratio of C=C double bonds in component E to transferable atoms/groups of atoms X in component B of least 3:1.

13. The telechelic composition obtainable according to claims 1.

14. The telechelic composition of claim 13, wherein the composition has a number average molecular weight of between 1000 and 5000.

* * * * *